(12) United States Patent
Timm

(10) Patent No.: US 6,835,915 B2
(45) Date of Patent: Dec. 28, 2004

(54) APPLIANCE FOR THE PREPARATION OF HOT DRINKS

(76) Inventor: Eberhard Timm, Kottmeierstrasse 1 G, Buxtehude (DE), 21614

( * ) Notice: Subject to any disclaimer, the term of this patent is extended or adjusted under 35 U.S.C. 154(b) by 0 days.

(21) Appl. No.: 10/820,243

(22) Filed: Apr. 6, 2004

(65) Prior Publication Data

US 2004/0206745 A1 Oct. 21, 2004

(30) Foreign Application Priority Data

Apr. 17, 2003 (EP) ............................................. 03009003

(51) Int. Cl.[7] ............................................... F27D 11/00
(52) U.S. Cl. ........................ 219/432; 219/429; 219/438; 99/288; 99/300
(58) Field of Search ................................ 219/429, 432, 219/438; 99/288, 300

(56) References Cited

U.S. PATENT DOCUMENTS

| | | | |
|---|---|---|---|
| 5,067,395 A | 11/1991 | Timm | |
| 5,243,164 A | * 9/1993 | Erickson et al. .............. 99/300 |
| 5,259,295 A | 11/1993 | Timm | |
| 5,287,796 A | 2/1994 | Timm | |
| 6,069,996 A | 5/2000 | Timm | |
| 6,327,965 B1 | 12/2001 | Lin Tien | |
| 6,443,050 B2 | 9/2002 | Timm | |

FOREIGN PATENT DOCUMENTS

EP          1 118 298 A       7/2001

* cited by examiner

*Primary Examiner*—J. Pelham
(74) *Attorney, Agent, or Firm*—Alix, Yale & Ristas, LLP

(57) ABSTRACT

The construction has been created such that the hot water is flowing from a closed secured container without danger of scalding and dripping over to the drinking cup, which is also secured.

12 Claims, 8 Drawing Sheets

APPLIANCE FOR THE PREPARATION OF HOT DRINKS

BACKGROUND OF THE INVENTION

The invention relates to an appliance for the preparation of hot drinks, soups and similar nutritional/semi-luxury foods, with a drinking cup and with a closable container, to be inserted in the latter and provided with an electrical heating device, for the liquid to be heated which, after heating, is emptied into the drinking cup after a valve of a container has been opened.

In a known appliance of this type (EP 1 118 298 A1), the container is inserted into a drinking cup and filled with water, and the latter is then heated with the aid of the electrical heating device. When the water has reached the necessary temperature, the container is partially lifted out of the drinking cup, so that the valve opens and the water passes into the drinking cup, where it dissolves the brewing substance previously introduced there. When all the water has passed out of the container into the drinking cup, the container can be lifted off, so that the drink can be tasted.

Appliances of this type are used, in particular, in motor vehicles, in which there is possibly not the necessary close attention given to operating them. This may lead to scalding or to the spillage of water.

When the container to be filled with water is held in the hand, the valve is opened, so that water poured in at the top runs out again at the bottom. If the heating container has in the meantime been deposited in another cup, but only to an extent such that the valve remains open, the heating container cannot fill up, since the water runs out again at the bottom until it overflows and runs out of the lower container. However, if the heating container has been correctly inserted and filled with water, so that no water has run out, there is the risk that the heating would be switched on at this moment. If the heating container is then lifted out of the cup in order to insert it into the cup containing the brewing substance, the water runs out at the bottom and may again cause scalding. Many different mishandling actions are therefore possible, which in a lesser case may lead to the spillage of water, but in a worse case may lead to serious scalding.

It is also known to provide a valve at the bottom of the container in which the water is heated, the said valve then opening when the excess pressure is generated as a result of heating (U.S. Pat. No. 5,287,796).

It is known, further, to fill a container with hot liquid, the container then opening when it is placed onto a drinking vessel, in that the edge of the drinking vessel acts on a spring-back circular valve actuation element (U.S. Pat. No. 6,327,965 B1).

The object of the invention is to provide an appliance of the type mentioned in the introduction, in which the valve is constructed more simply and the appliance can be used in a more versatile way.

SUMMARY OF THE INVENTION

In the solution according to the invention, the valve is designed to co-operate with an axially extending middle projection in the drinking cup for opening the valve when the container is inserted into the drinking cup, and the projection is arranged on a disc-shaped element which is provided with perforations and which can be inserted into the drinking cup at a distance from the bottom of the latter.

The object of the invention is to provide an appliance of the type mentioned in the introduction, which can be operated more simply and more reliably.

In the solution according to the invention, the valve is designed to co-operate with devices, arranged in the drinking cup, for opening the valve when the container is inserted into the drinking cup.

The container in which the liquid is to be heated may, for example, be held in the hand when it is being filled. The valve remains closed, so that no liquid can emerge. However, the container may also be inserted into a vessel and remain there, possibly even for a lengthy period of time, until it is required. Its outside is thereby protected against soiling. This presents no problems in motor vehicles, since, normally, cup holders are arranged in pairs or at least two cup holders are arranged in some proximity to one another. In this state, the container may also be filled with liquid, that is to say, normally, water.

If a hot drink is to be prepared, the heating is switched on, the container preferably still being located in the other vessel. When the brewing temperature is reached, the container, together with the heated liquid, is inserted into the actual drinking cup, the valve then being opened during insertion, so that the hot water can pass downwards into the drinking cup, where the brewing substance has previously been introduced. When the heating container is emptied, it can be taken out of the drinking cup and, for example, inserted again into the other vessel, for example a cup, which is not provided with corresponding devices for opening the valve, until the heating container is required again.

The mishandling actions mentioned in the introduction with regard to the appliance of the prior art therefore cannot occur. It is possible simply for liquid to emerge from the heating container when the latter is inserted into the drinking cup.

The projection is arranged on a disc-shaped element which is provided with perforations and which can be inserted into the drinking cup at a distance from the bottom of the latter. The disc-shaped element may in this case be designed as a slosh-over safeguard. To be precise, when the container in which the water has been heated is lifted out of the drinking cup again, the disc-shaped element is arranged above the surface of the prepared drink, with perforations which sharply brake or damp the movements of the liquid in such a way that the liquid can no longer slosh over. The disc-shaped element can then be taken out in order to taste the drink or else may also remain there, in order to avoid sloshing over even when the prepared drink is being tasted.

The container for the liquid to be heated is closeable, as mentioned, in order to avoid a spillage or sloshing over of the liquid. It has proved particularly expedient, here, if the container for the liquid to be heated is provided with a swing-open lid. This can be opened quickly and a large orifice is available in order to introduce liquid.

It has proved particularly advantageous if the lid can be locked in the closed position by means of a slide or a pivotable disc. Thus, when the container is filled, the closed lid is secured by means of the slide or the disc, so that the lid cannot open by mistake or in the event of an accident, even if it falls out of the holding device, which would mean the risk of the spillage of water or, in the case of hot water, even the risk of scalding.

Expediently, in this case, the slide or the disc is designed as a switch for the heating device, actuates a switch for the heating device or makes a switch for the heating device accessible only when the lid is interlocked. In this case, it is possible to ensure that the heating device is actuated or can be actuated only when the lid is closed. The risk of mishandling actions is thereby further reduced.

BRIEF DESCRIPTION OF THE DRAWINGS

The invention is described below by means of advantageous embodiments, with reference to the accompanying drawings in which.

DETAILED DESCRIPTION OF THE PREFERRED EMBODIMENTS

Figure 1:
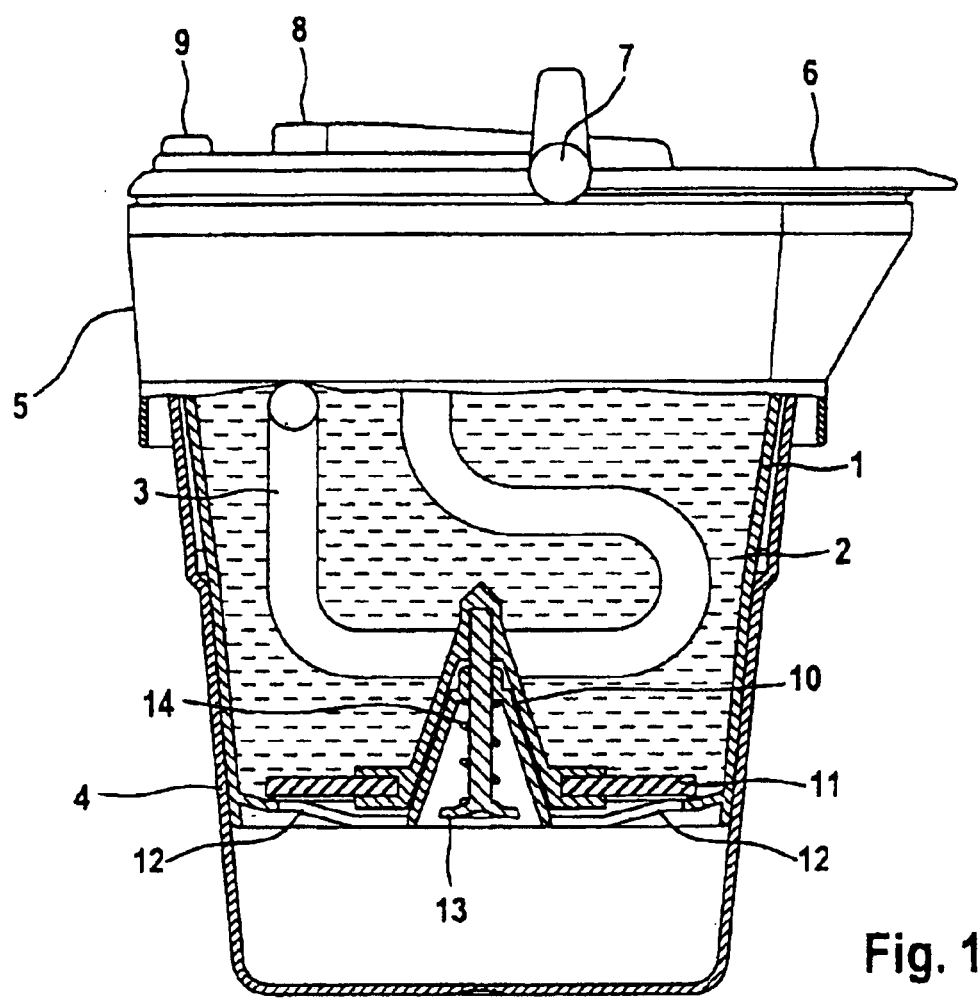
FIG. 1 shows, partially in section, a container for liquid to be heated.

FIG. 1 shows a container 1, in which liquid, in particular water 2, can be heated by means of a heating coil 3. The cup 1 is in this case inserted into a vessel 4 which may be in the form of a drinking cup. The container 1 has an upper cover 5 with a flap 6 which is mounted pivotably at 7 and can be closed by means of a slide 8. A switch, by means of which the heating coil can be switched on and off, is arranged at 9. In the bottom of the container 1 is arranged a valve which has a valve plate 10 with a conical middle part and a rubber seal 11 arranged on the circumference. The latter closes orifices 12 in the illustration shown in FIG. 1. The valve plate 11 is connected to a tappet 13. By means of a compression spring 14, this tappet 13 is pressed downwards and consequently presses the valve into the closed position.

Figure 3:
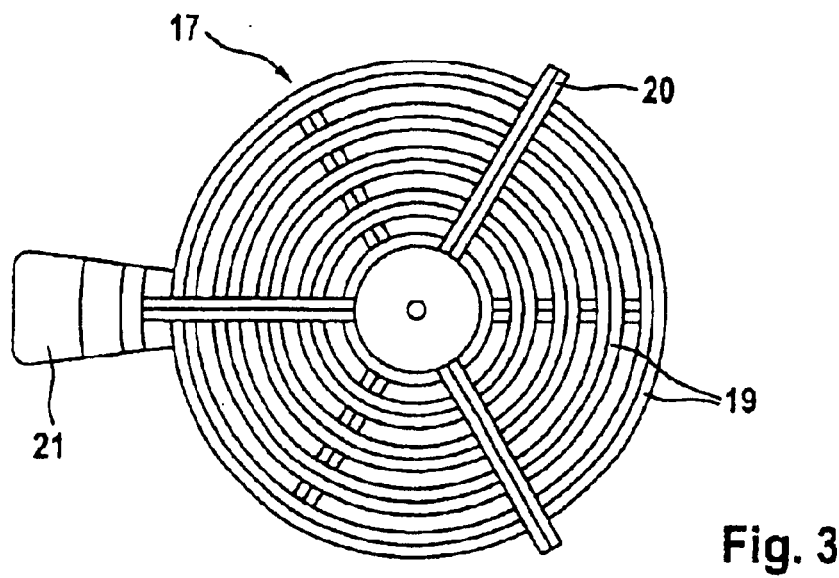
FIG. 3 shows the slosh-over protection of FIG. 2, seen from above.
Figure 2:
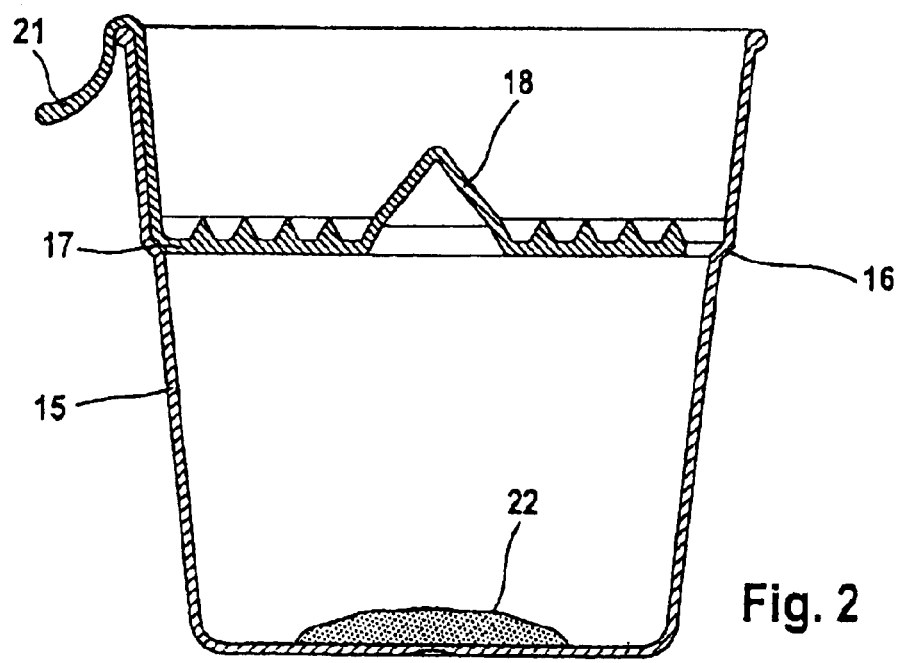
FIG. 2 shows, in section, a drinking cup with inserted slosh-over protection.

The drinking cup 15 shown in FIG. 2 has on its circumference a shoulder 16 onto which is placed a disc-shaped element 17 having a middle elevation 18. The disc-shaped element 17 is constructed from concentric elements 19 which are held together by means of radial webs 20. Moreover, the disc-shaped element 17 has a tab 21, by means of which it can be lifted out of the cup 15. The disc-shaped element 17 is shown from above in FIG. 3.

Figure 4:
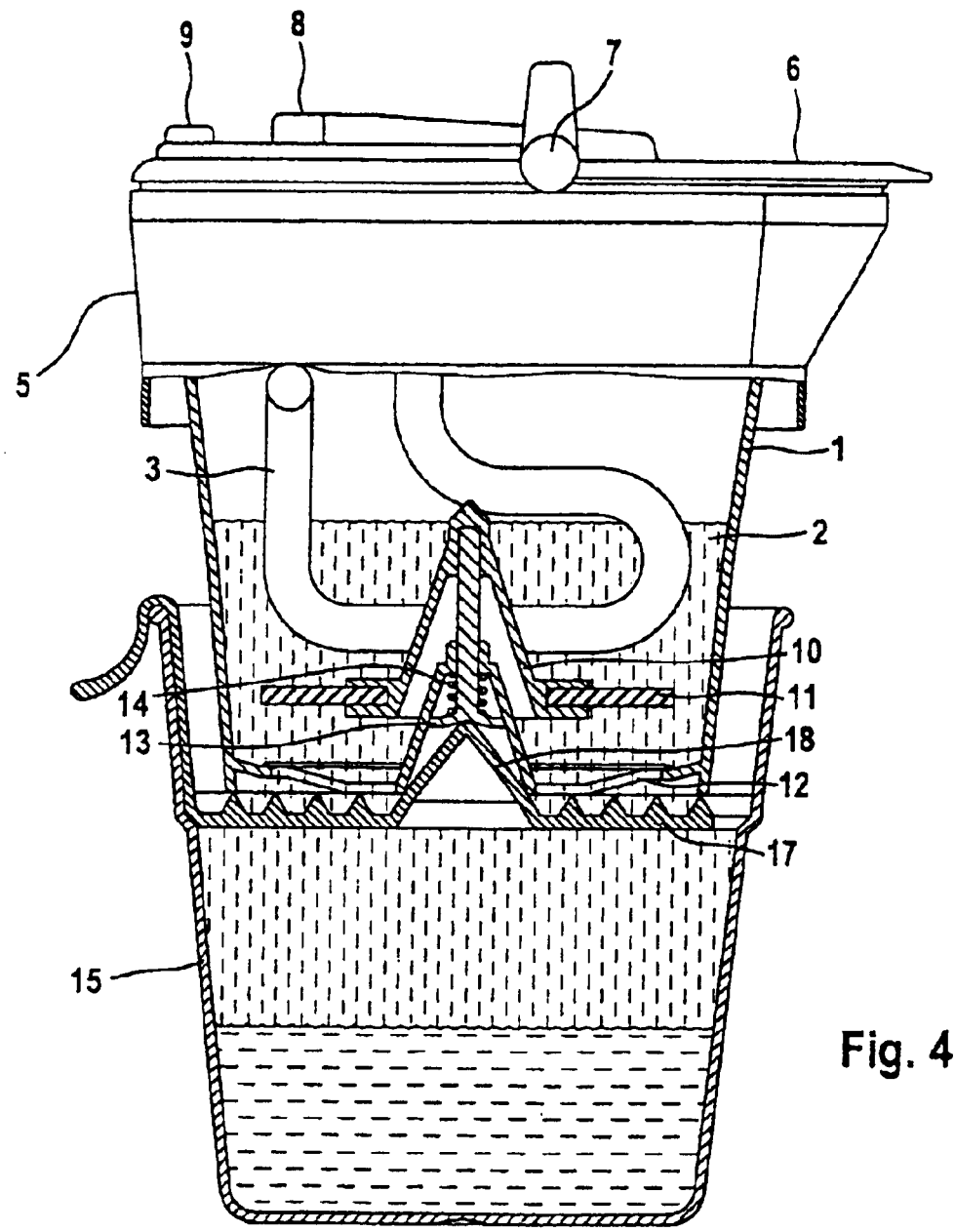
FIG. 4 shows an illustration after the heating of the water, after the container together with the heated water is inserted into the drinking cup.

When the water 2 in the container 1 is heated, then, the container 1 of FIG. 1 is inserted into the cup 15 of FIG. 2, into which a brewing substance 22 has previously been introduced. As shown in FIG. 4, in this case the projection 18 presses the tappet 13 upwards counter to the force of the spring 14, so that the valve plate 10, together with the seals 11, moves upwards and the water 2 can pass downwards through the orifices 12 and the orifices of the disc-shaped element 17 and dissolves the brewing substance 22.

Subsequently, the container 1 can be lifted out of the cup 15, so that, if appropriate, after the removal of the disc-shaped element 17, the prepared drink can be tasted.

Figure 5:
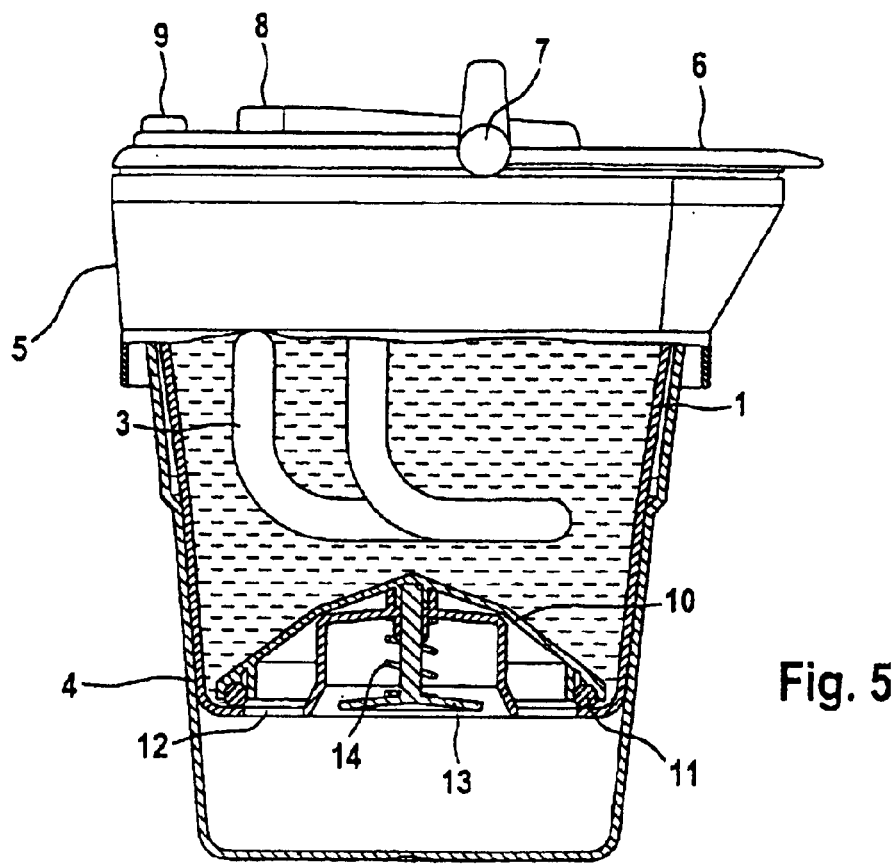
FIG. 5 shows another embodiment of the container of FIG. 1.
Figure 6:
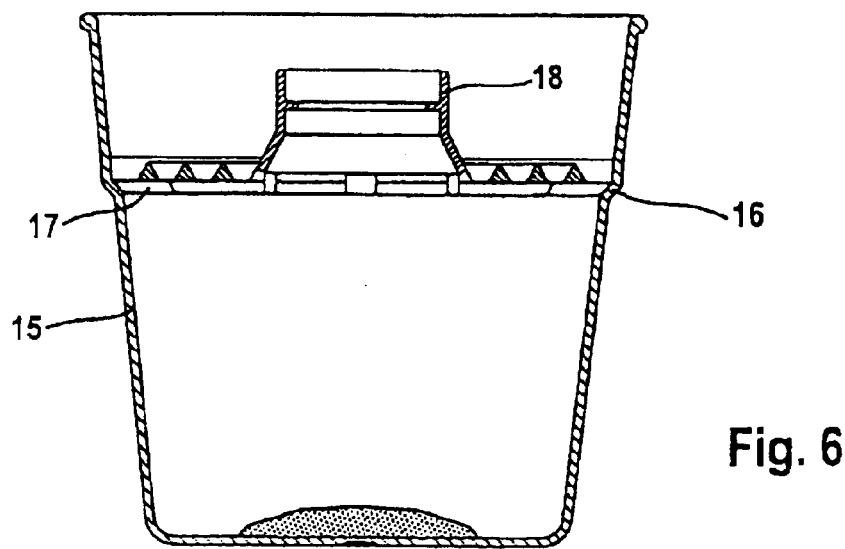
FIG. 6 shows another embodiment of the drinking cup with the slosh-over protection of FIG. 2.
Figure 7:
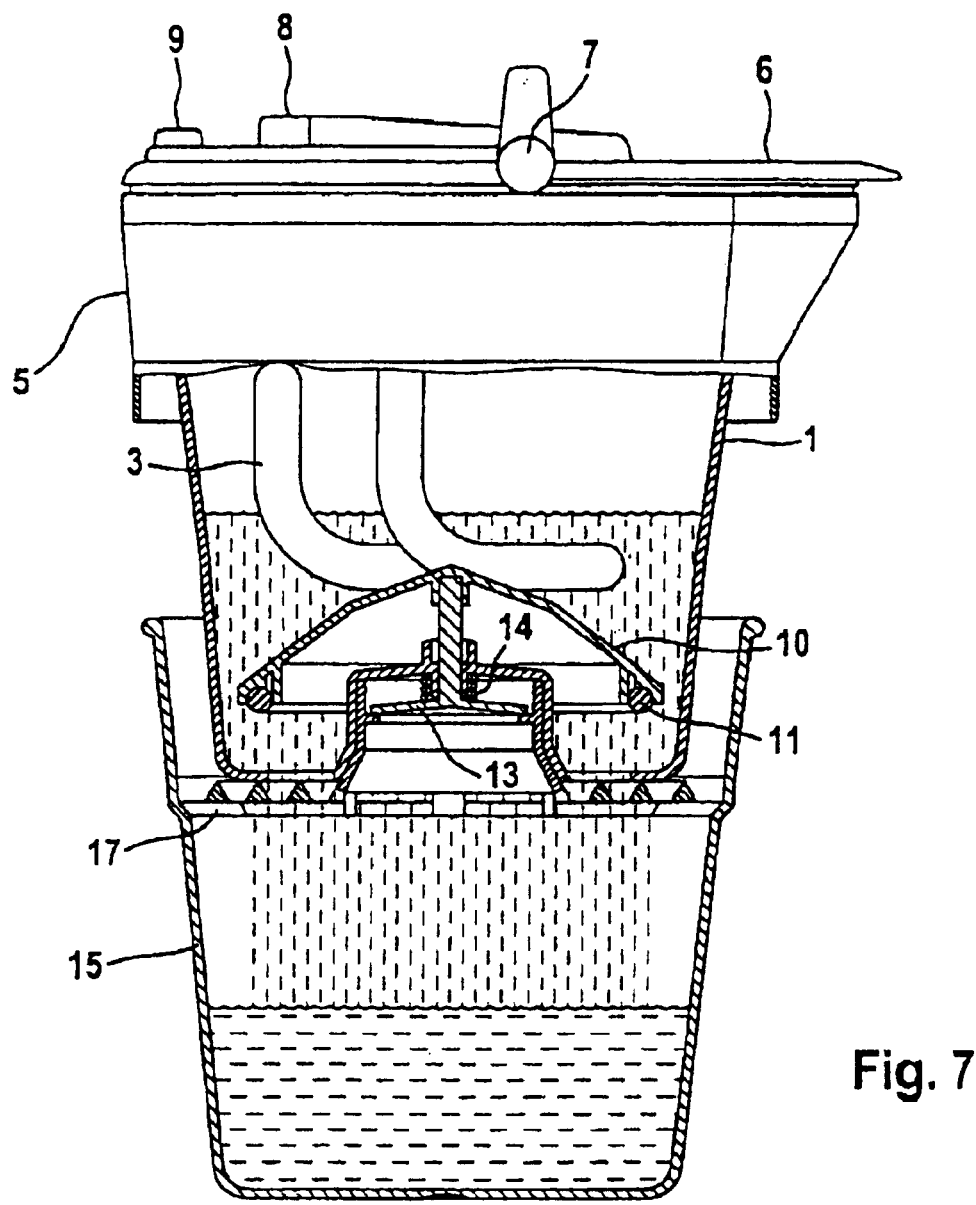
FIG. 7 shows the container of FIG. 5, which is inserted into the drinking cup of FIG. 6.

The embodiments of FIGS. 5 to 7 correspond essentially to those of FIGS. 1 to 4, the difference being that the middle projection 18 of the disc-shaped element 17 is larger and co-operates with a larger tappet 13. Moreover, the valve plate 10 is designed essentially conically and carries an O-ring seal 11 at its edge.

The form of the drinking cups may be varied widely. Reusable drinking cups or disposable drinking cups may be used. It is critical merely that a disc-shaped element 17 having a projection 18 can be inserted.

Figure 8:
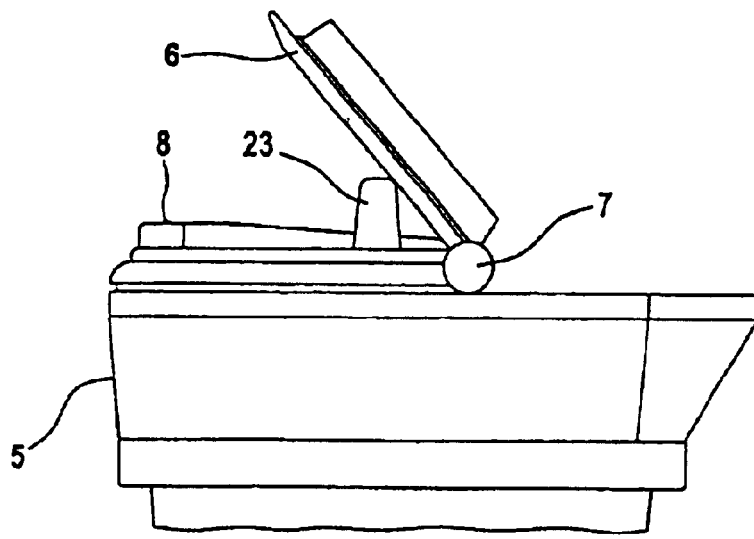
FIGS. 8–10 show details of the lid by means of which the container can be closed.
Figure 9:
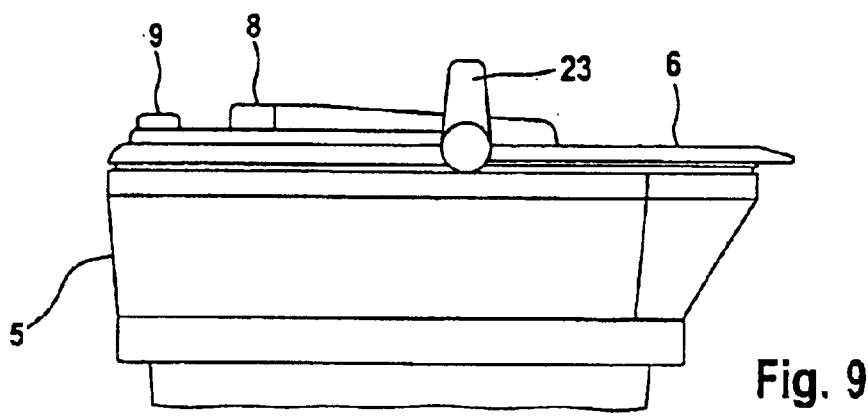
Figure 10:
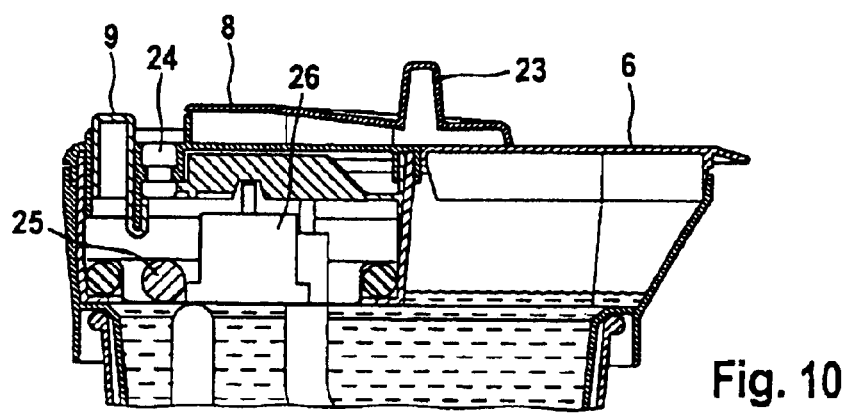

The upper cover 5 is explained in more detail in FIGS. 8 to 10. The cover 5 has a flap 6 which can be pivoted about a joint 7. The flap 6 is shown in the open position in FIG. 8 and in the closed position in FIG. 9. The lid 5 has located on it, further, a slide 8 with a handle 23, the said slide being displaced to the right in FIG. 9, as compared with the position of FIG. 8, and thus interlocking the flap 6. A switch 9, which is concealed in the position of FIG. 8, is thereby exposed at the same time. As a result, either the current is set automatically or the possibilities afforded of actuating the switch 9 so that the current can be switched on.

FIG. 10 shows, in section, the position of the parts of FIG. 9, also showing a light-emitting diode 24, by means of which the switched-on state of the heating device can be signalled.

Figure 11:
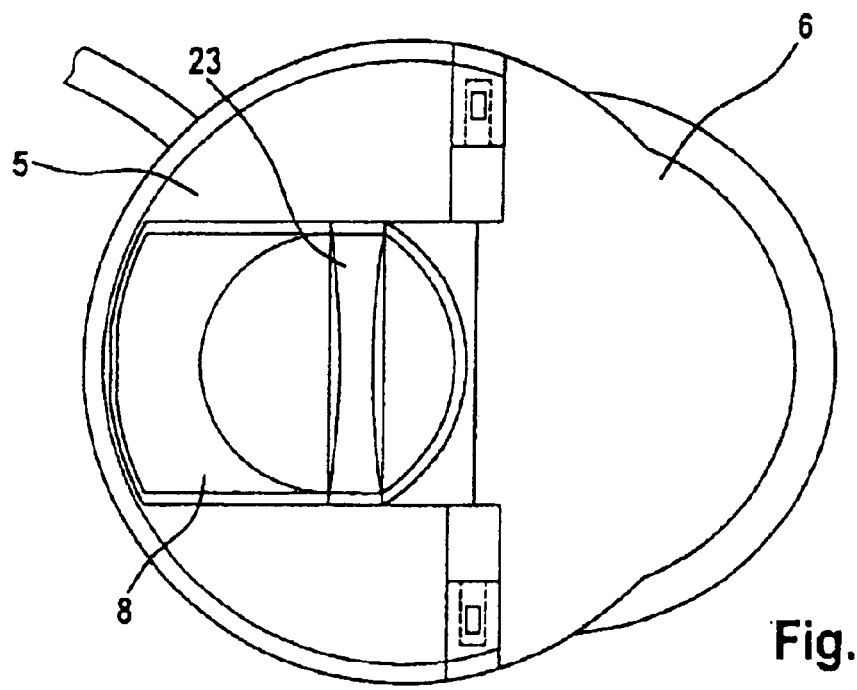
FIGS. 11–12 show views of the lid of FIGS. 8–10 before and after interlocking by means of a slide.
Figure 12:
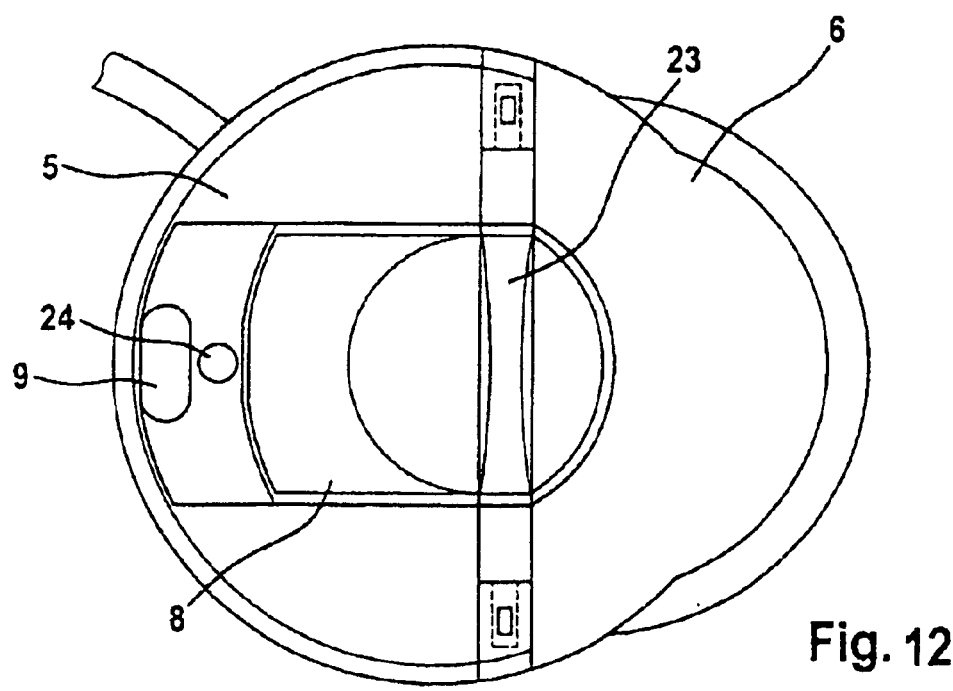

FIGS. 11 and 12 show the cover 5 from above, the flap 6 still being capable of being opened in the illustration of FIG. 11, whereas it is interlocked in the position of the slide 8 of FIG. 12, in order to prevent sloshing over or leakage. Further safety measures are the run-dry protection 25 and a temperature switch 26 which are shown in FIG. 10. In a further safety feature, if the operator lifts the container out of the cup before the hot water has run into the cup completely, the valve 10 closes immediately, so that, to that extent, too, the risk of scalding is ruled out.

Figure 13:
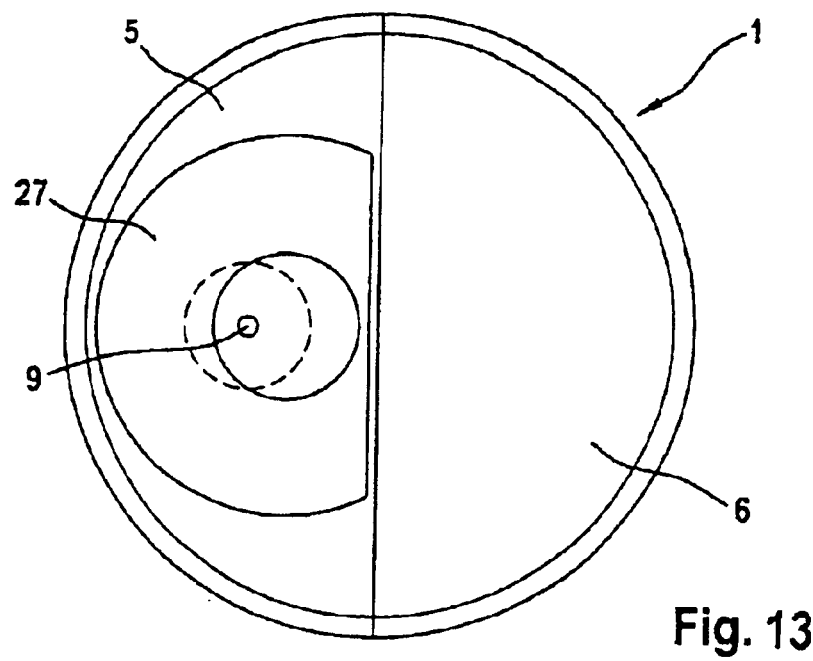
FIGS. 13–14 show an embodiment with a pivotable disc in views similar to those of FIGS. 11 and 12.
Figure 14:
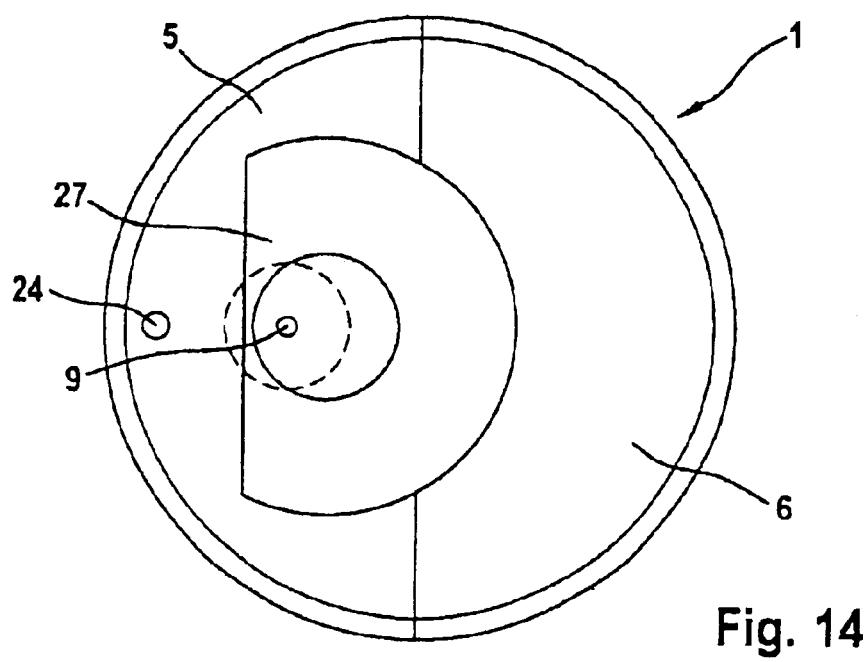

The embodiment shown in FIGS. 13 and 14 has, for interlocking the lid 6, a pivotable disc 27 instead of a slide 8.

What is claimed:

1. Appliance for the preparation of hot drinks, soups and similar nutritional/semi-luxury foods, with a drinking cup and with a closable container, to be inserted in the latter and provided with an electrical heating device, for the liquid to be heated, which, after heating, is emptied into the drinking cup after a valve of a container has been opened, characterized in that the valve is designed to co-operate with an axially extending middle projection in the drinking cup for opening the valve when the container is inserted into the drinking cup, and in that the projection is arranged on a disc-shaped element which is provided with perforations and which can be inserted into the drinking cup at a distance from the bottom of the latter.

2. Appliance according to claim 1, characterized in that the disc-shaped element is designed as a slosh-over safeguard.

3. Appliance according to claim 1, characterized in that the container for the liquid to be heated is provided with a swing-open lid.

4. Appliance according to claim 3, characterized in that the lid can be locked in the closed position by means of an interlock in the form of a slide.

5. Appliance according to claim 3, characterized in that the lid can be locked in the closed position by means of an interlock in the form of a pivotable disc.

6. Appliance according to claim 4, characterized in that the interlock is designed as a switch for the heating device.

7. Appliance according to claim 4, characterized in that the interlock actuates a switch for the heating device.

8. Appliance according to claim 4, characterized in that the interlock makes a switch for the heating device accessible during the locking of the lid.

9. Appliance according to claim 2, characterized in that the container for the liquid to be heated is provided with a swing-open lid.

10. Appliance according to claim 5, characterized in that the interlock is designed as a switch for the heating device.

11. Appliance according to claim 5, characterized in that the interlock actuates a switch for the heating device.

12. Appliance according to claim 5, characterized in that the interlock makes a switch for the heating device accessible during the locking of the lid.

* * * * *